J. L. KING.
CANOE ATTACHMENT.
APPLICATION FILED NOV. 30, 1920

1,370,592.

Patented Mar. 8, 1921.

INVENTOR
John L. King
BY
ATTORNEYS

UNITED STATES PATENT OFFICE.

JOHN L. KING, OF EAST ORANGE, NEW JERSEY.

CANOE ATTACHMENT.

1,370,592.     Specification of Letters Patent.     Patented Mar. 8, 1921.

Application filed November 30, 1920. Serial No. 427,407.

*To all whom it may concern:*

Be it known that I, JOHN L. KING, a citizen of the United States, and resident of East Orange, in the county of Essex and State of New Jersey, have invented a new and useful Improvement in Canoe Attachments, of which the following is a specification.

The object of my invention is to provide an attachment for canoes, which attachment will serve a double purpose, viz; as a back rest when the canoe is in use, and as a wheeled carrier for the canoe when it is required to transport the canoe from place to place on land.

My attachment more particularly includes a back rest which is removable from the canoe, which back rest is provided with wheels on its opposite sides, the wheels being preferably removably attached to a transversely arranged axle carried by the back rest. Means, such as cords carried by the back rest, are provided for securing the back rest to the canoe when the back rest is used as a wheeled carrier for the canoe. The back rest may also be provided with a cushion upon which the bottom of the canoe may rest, the cushion having a keel receiving groove so that a stable support for the canoe on the back rest is provided.

A practical embodiment of my invention is represented in the accompanying drawing, in which, Figure 1 represents the attachment in front elevation with the back rest in its position for use in the canoe, the outline of the canoe being shown in dotted lines.

Figure 1:
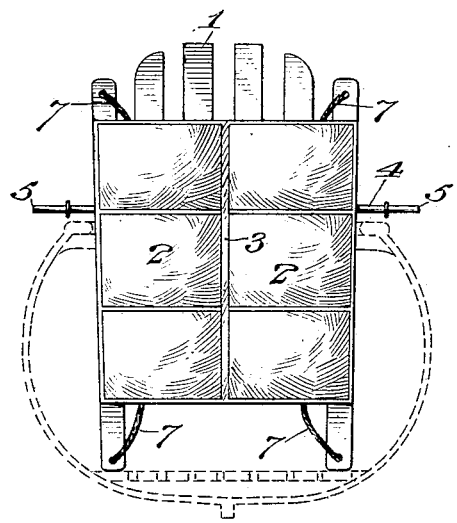
Figure 2:
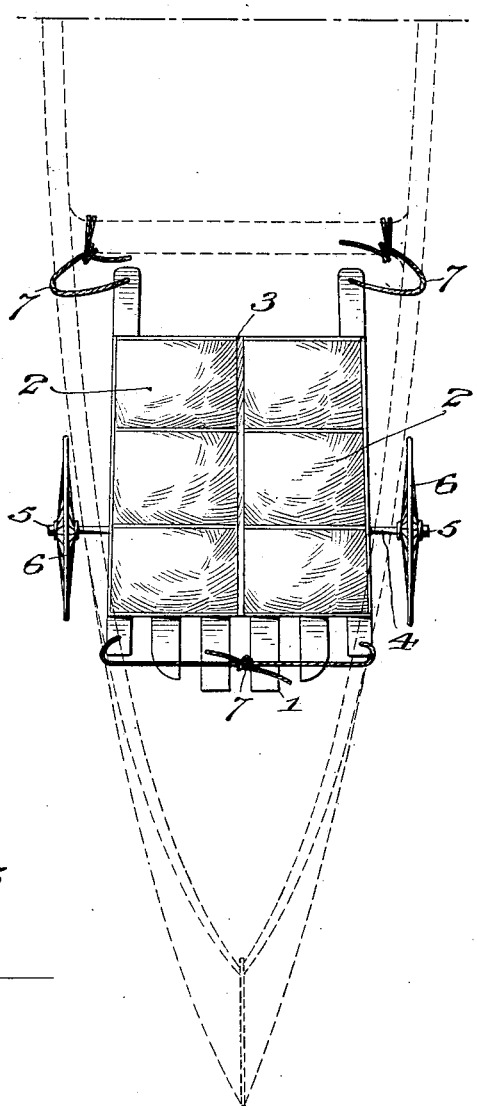
Fig. 2 represents a top plan view of the attachment with the back rest in position for use as a wheeled carrier for the canoe, the outline of the canoe being shown in dotted lines.
Figure 3:
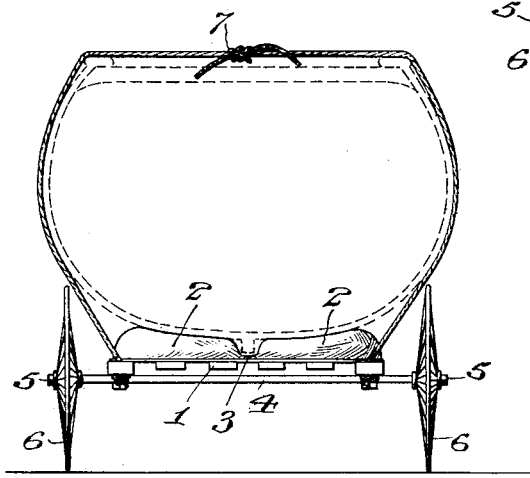
Fig. 3 represents an end view of the attachment when in position for use as a wheeled carrier for the canoe, the outline of the canoe being shown in dotted lines.

The back rest is denoted by 1 and may be of any well known or approved construction. This back rest is shown as provided with a cushion 2 having a keel receiving groove 3 extending longitudinally therethrough from top to bottom of the cushion.

The back rest is further provided with a transversely arranged axle 4, the wheel receiving spindles 5 of which project beyond the sides of the canoe. Wheels 6 of any well known or approved construction are removably attached to the axle 4 on the spindles 5.

Means such as flexible cords 7 are carried by the back rest 1. In the present instance, these cords are attached at the upper and lower corners of the back rest. When the back rest is in use in the canoe, the wheels 6 may be removed from the axle and stowed away in the canoe. When it is desired to use the back rest as a wheeled carrier for the canoe, the wheels 6 are attached to the spindles 5 of the axle 4 and the back rest is placed under the canoe with the bottom of the canoe resting on the cushion 2, the keel of the canoe being placed in the groove 3. The cords 7 are then passed around the canoe and tied, either together or to a convenient cross stay or cleat thereby fastening the attachment firmly to the canoe.

From the above description it will be seen that my improved attachment serves a double function in that it may be used as a back rest in the canoe and also may be used as a wheeled carrier for transporting the canoe from place to place on land.

It is evident that various changes may be resorted to in the construction, form and arrangement of the several parts without departing from the spirit and scope of my invention; hence I do not wish to limit myself to the particular embodiment herein represented, but

What I claim is:—

1. A canoe attachment including a removable back rest, and wheels carried thereby.

2. A canoe attachment including a removable back rest, and wheels fitted to be removably attached thereto.

3. A canoe attachment including a removable back rest, a cushion therefor having a keel receiving groove, and wheels carried by the back rest.

4. A canoe attachment including a removable back rest, a cushion therefor having a keel receiving groove, and wheels fitted to be removably attached to the back rest.

5. A canoe attachment including a removable back rest, a transversely arranged axle carried thereby, and wheels carried by the axle.

6. A canoe attachment including a removable back rest, a transversely arranged axle carried thereby, and wheels fitted to be removably attached to the axle.

7. A canoe attachment including a removable back rest, a cushion therefor having a keel receiving groove, a transversely arranged axle carried by the back rest, and wheels carried by the axle.

8. A canoe attachment including a removable back rest, a cushion therefor having a keel receiving groove, a transversely arranged axle carried by the back rest, and wheels fitted to be removably attached to the axle.

9. A canoe attachment including a removable back rest, wheels carried thereby, and means for securing the back rest to the canoe when used as a carrier therefor.

10. A canoe attachment including a removable back rest, wheels fitted to be removably attached thereto, and means for securing the back rest to the canoe when used as a wheeled carrier therefor.

In testimony, that I claim the foregoing as my invention, I have signed my name this 15th day of November 1920.

JOHN L. KING.